United States Patent
Kainuma et al.

(10) Patent No.: US 6,877,711 B2
(45) Date of Patent: Apr. 12, 2005

(54) VIBRATION ISOLATION TABLE

(75) Inventors: Masakuni Kainuma, Saitama (JP); Toshikazu Aoki, Saitama (JP); Keiji Tamaki, Saitama (JP); Katsuo Uematsu, Saitama (JP); Tomomasa Fujita, Saitama (JP); Hiroshi Chinda, Saitama (JP); Akihiro Hayashi, Saitama (JP)

(73) Assignee: Fujikura Rubber Ltd., Tokyo (JP)

( * ) Notice: Subject to any disclaimer, the term of this patent is extended or adjusted under 35 U.S.C. 154(b) by 0 days.

(21) Appl. No.: 10/722,773

(22) Filed: Nov. 26, 2003

(65) Prior Publication Data

US 2004/0104330 A1 Jun. 3, 2004

(30) Foreign Application Priority Data

Nov. 28, 2002 (JP) ......................................... 2002-345870

(51) Int. Cl.⁷ .................................................. F16M 9/00
(52) U.S. Cl. .......................... 248/638; 248/550; 248/676
(58) Field of Search ................................ 248/638, 676, 248/560, 562, 605, 636, 550

(56) References Cited

U.S. PATENT DOCUMENTS

| | | | | |
|---|---|---|---|---|
| 3,589,655 A | * | 6/1971 | Hackbarth et al. | 248/550 |
| 5,765,800 A | * | 6/1998 | Watanabe et al. | 248/550 |
| 6,164,023 A | * | 12/2000 | Horikiri et al. | 52/167.8 |
| 2001/0041119 A1 | * | 11/2001 | Hasegawa et al. | 414/217 |

FOREIGN PATENT DOCUMENTS

| | | | | |
|---|---|---|---|---|
| JP | 53-68364 | * | 6/1978 | 248/638 |
| JP | 1-307633 | * | 12/1999 | 73/65.08 |
| WO | WO 94/13999 | * | 6/1994 | |

* cited by examiner

*Primary Examiner*—Ramon O Ramirez
(74) *Attorney, Agent, or Firm*—McCormick, Paulding & Huber LLP

(57) ABSTRACT

A vibration isolation table includes a stationary housing having an opening on top thereof; a pressure-tight flexible member which closes the opening to form a first pressure chamber in the stationary housing; a primary movable base which is coupled to a central portion of the pressure-tight flexible member, the primary movable base having a bottomed hollow cylindrical member; an intermediate movable base having a swingable rod which is inserted into the bottomed hollow cylindrical member so that a bottom end of the swingable rod is supported thereby to allow the swingable rod to swing with respect to the bottomed hollow cylindrical member; and a vibration-free base on which an object to be isolated from vibration is mounted, a second pressure chamber being formed between the intermediate movable base and the vibration-free base, the second pressure chamber being capable of expanding and contracting vertically.

7 Claims, 2 Drawing Sheets

VIBRATION ISOLATION TABLE

CROSS REFERENCE TO RELATED APPLICATION

The present application is related to and claims priority of the following co-pending application, namely, Japanese patent application number 2002-345870 filed on Nov. 28, 2002.

BACKGROUND OF THE INVENTION

1. Field of the Invention

The present invention relates to a vibration isolation table for supporting an object to be isolated from vibration such as a precision instrument while isolating the object from vibration which is transmitted from the floor to the vibration isolation table, and more specifically, relates to such a vibration isolation table, the natural vibration frequency of which in the horizontal direction is small.

2. Description of the Related Art

As an example of a vibration isolation table for preventing vibration from the floor from being transmitted to a precision instrument (e.g., an optical stepper or an electron microscope) which is supported by the vibration isolation table, a vibration isolation table which includes a stationary housing, a pressure-tight flexible member (diaphragm), a primary movable base, a bottomed hollow cylindrical member and a vibration-free base is known in the art. The stationary housing is provided on top thereof with an opening. The pressure-tight flexible member is positioned to close this opening in an airtight fashion to form a first pressure chamber. The primary movable base is coupled to a central portion of the pressure-tight flexible member. The bottomed hollow cylindrical member, the top end of which is formed as an open end, is formed integral with the primary movable base to extend downwards from a central portion of the primary movable base into the first pressure chamber. The vibration-free base includes a swingable rod which extends inside the bottomed hollow cylindrical member, and amount which is fixed to the upper end of the swingable rod. The lower end of the swingable rod is supported by a bottom part of the bottomed hollow cylindrical member so that the swingable rod can swing with respect to the bottomed hollow cylindrical member.

If the floor on which the vibration isolation table is placed vibrates horizontally with a precision instrument being mounted on the mount of the vibration-free base, the swingable rod swings (oscillates) with the bottom end thereof, which is in contact with a bottom part of the bottomed hollow cylindrical member to be supported thereby, being the center of oscillation, to prevent the horizontal vibration of the floor from being transmitted to the precision instrument. This greatly reduces the influence of the horizontal vibration on the precision instrument.

In the case where the floor on which the precision instrument is placed vibrates vertically, some elements of the vibration isolation table such as the primary movable base and the swingable rod move up and down with respect to the stationary housing to prevent the vertical vibration of the floor from being transmitted to the precision instrument.

In such a vibration isolation table, the natural vibration frequency thereof in the horizontal direction is reduced to thereby improve the performance of a horizontal vibration isolating operation of the vibration isolation table by making an adjustment to the length of the bottomed hollow cylindrical member and the length of the swingable rod.

An improved vibration isolation table in which the natural vibration frequency thereof in the horizontal direction is further reduced to thereby further improve the performance of the horizontal vibration isolating operation has been desired in recent years. However, such an improved vibration isolation table cannot be achieved simply by making an adjustment to the length of the bottomed hollow cylindrical member and the length of the swingable rod.

SUMMARY OF THE INVENTION

The present invention provides a vibration isolation table, wherein the natural vibration frequency thereof in the horizontal direction can be reduced to a smaller degree to greatly improve the performance of the horizontal vibration isolating operation, thus exerting substantially no influence of the horizontal vibration on an object such as a precision instrument which is supported by the vibration isolation table.

According to an aspect of the present invention, a vibration isolation table is provided, including a stationary housing having an opening on a top surface thereof; a pressure-tight flexible member which closes the opening to form a first pressure chamber in the stationary housing; a primary movable base which is coupled to a central portion of the pressure-tight flexible member, the primary movable base having a bottomed hollow cylindrical member which is provided at a center of the primary movable base and extends downwards to be positioned in the first pressure chamber, an upper end of the bottomed hollow cylindrical member being formed as an open end; an intermediate movable base having a swingable rod which is inserted into the bottomed hollow cylindrical member so that a bottom end of the swingable rod is supported by a bottom of the bottomed hollow cylindrical member in a manner to allow the swingable rod to swing with respect to the bottomed hollow cylindrical member; and a vibration-free base on which an object to be isolated from vibration is mounted, a second pressure chamber being formed between the intermediate movable base and the vibration-free base, the second pressure chamber being capable of expanding and contracting vertically.

The pressure-tight flexible member can be a rolling diaphragm.

The vibration isolation table can further include a bellows which surrounds the second pressure chamber to form the second pressure chamber inside the bellows.

It is desirable for respective air pressures in the first pressure chamber and the second pressure chamber to be controlled so as to become the same as each other.

It is desirable for the intermediate movable base to include a flat plate which is formed integral with an upper end of the swingable rod so that an axis of the swingable rod extends orthogonal to the flat plate, and for the second pressure chamber to be formed between the vibration-free base and the flat plate.

The primary movable base and the intermediate movable base can constitute a gimbal piston.

The vibration isolation table can further include a bellows-fixing under plate which has the same shape as the vibration-free base and is fixed to an upper surface of the flat plate. An upper peripheral edge and an lower peripheral edge of the bellows are fixed to the vibration-free base and the bellows-fixing under plate, respectively.

The present disclosure relates to subject matter contained in Japanese Patent Application No. 2002-345870 (filed on Nov. 28, 2002) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
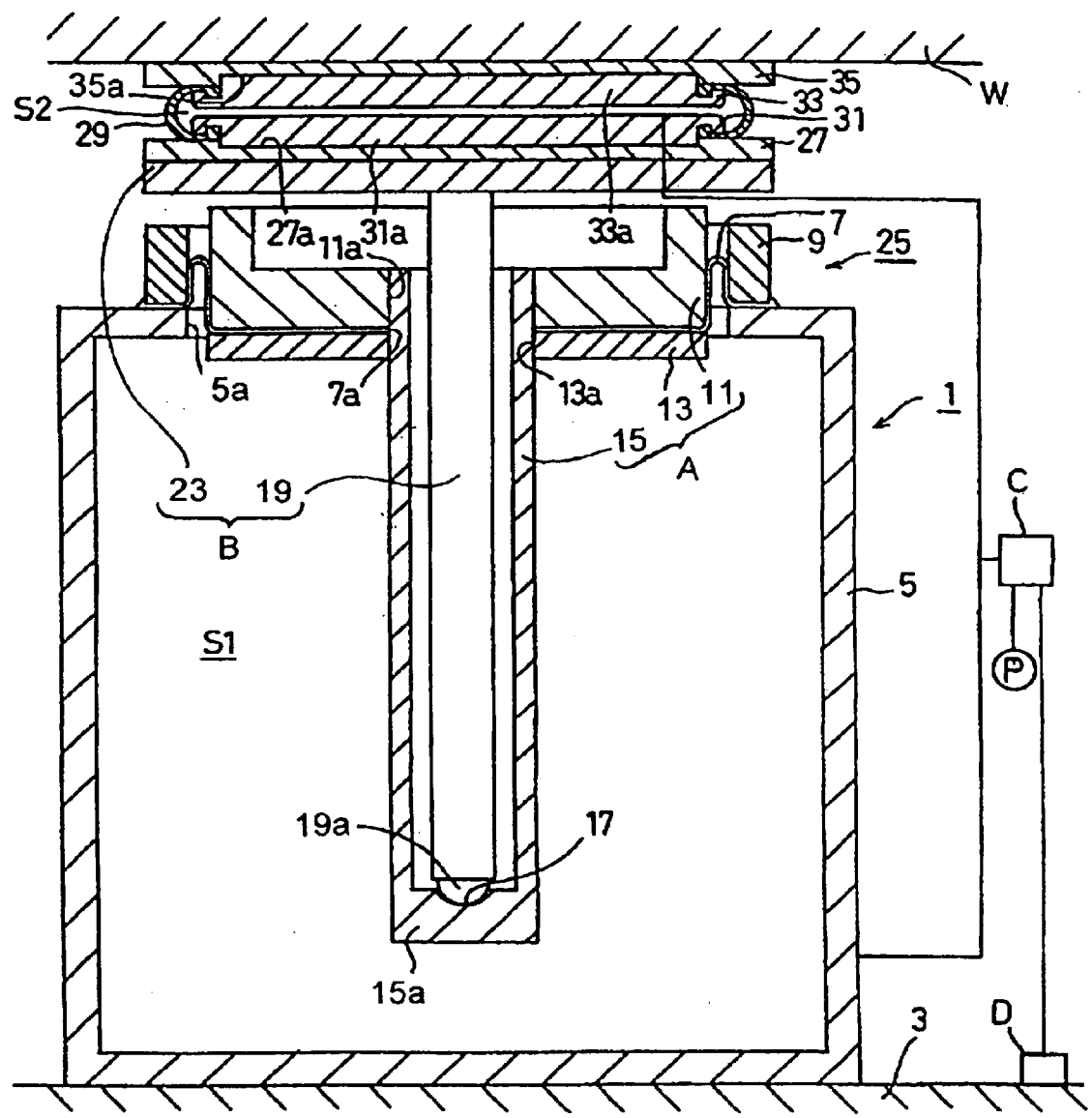
FIG. 1 is a longitudinal cross sectional view of an embodiment of a vibration isolation table according to the present invention.

An embodiment of a vibration isolation table 1 is provided with a stationary housing 5, a diaphragm (a pressure-tight flexible member) 7, a fixing ring 9, and a primary movable base A. The vibration isolation table 1 is placed on a floor 3 with a bottom surface of the stationary housing 5 contacting the floor 3. A circular opening 5a is provided on the top of the stationary housing 5. The diaphragm (rolling diaphragm) 7 closes the circular opening 5a to form a first pressure chamber S1 in the stationary housing 5. Specifically, the outer edge of the diaphragm 7 is held tight in an airtight fashion between an upper surface of the stationary housing 5 and the fixing ring 9, and the center of the diaphragm 7 is fixed to the primary movable base A via a circular through hole 7a formed at the center of the diaphragm 7. The primary movable base A consists of a ring-shaped piston 11, a ring-shaped base plate 13 and a bottomed hollow cylindrical member 15. The ring-shaped piston 11 and the base plate 13 are provided at respective centers thereof with a first circular fixing hole 11a and a second circular fixing hole 13a. The bottomed hollow cylindrical member 15 extends through the ring-shaped piston 11, the diaphragm 7, and the ring-shaped base plate 13 via the first circular fixing hole 11a, the circular hole 7a, and the second circular fixing hole 13a, in that order. The ring-shaped piston 11 and the ring-shaped base plate 13 are positioned on respective sides (upper and lower sides) of the diaphragm 7. An upper end of the bottomed hollow cylindrical member 15 is firmly fitted into the first circular fixing hole 11a to be fixed thereto, and the remaining portion of the bottomed hollow cylindrical member 15 extends downwards to be positioned in the first pressure chamber S1 via the second circular fixing hole 13a. The upper end of the bottomed hollow cylindrical member 15 is formed as an open end. A base 15a of the bottomed hollow cylindrical member 15 is provided on a top surface inside the bottomed hollow cylindrical member 15 with a concave (bowl-shaped) supporting surface 17.

The vibration isolation table 1 is provided with an intermediate movable base B which is supported by the bottomed hollow cylindrical member 15 to be freely swingable with respect to the bottomed hollow cylindrical member 15. The intermediate movable base B is provided with a swingable rod 19 and an outer flat plate 23. The swingable rod 19 is inserted into the bottomed hollow cylindrical member 15 until the bottom end of the swingable rod 19 contacts with the concave supporting surface 17 so that the swingable rod 19 can swing (oscillate) with the bottom end thereof being the center of oscillation. The outer flat plate 23 is integrally formed with the upper end of the swingable rod 19. An axis of the swingable rod 19 is orthogonal to the outer flat plate 23. The swingable rod 19 is provided at the lower end thereof with a hemispherical end 19a which facilitates the swinging action of the intermediate movable base B. The primary movable base A and the intermediate movable base B constitute a gimbal piston 25. A gimbal piston of a conventional vibration isolation table is constructed so that an object which is to be isolated from vibration, e.g., a precision instrument, is mounted directly on the outer flat plate of the gimbal piston, which corresponds to the outer flat plate 23.

In the present embodiment of the vibration isolation table 1, an object such as a precision instrument is not mounted directly on the outer flat plate 23. The vibration isolation table 1 is provided above the outer flat plate 23 with a vibration-free base 35 on which an object such as a precision instrument is directly mounted. A second pressure chamber S2 is formed between the outer flat plate 23 and the vibration-free base 35.

A bellows-fixing under plate 27 in the shape of a disc is fixed to an upper surface of the outer flat plate 23. The bellows-fixing under plate 27 is provided on an upper surface thereof with a circular recess 27a. An annular bellows 29 made of rubber is mounted on an upper surface of the bellows-fixing under plate 27 around the circular recess 27a. A lower peripheral edge of the annular bellows 29 is fixed to the bellows-fixing under plate 27 via a first bellows-fixing inner plate 31. More specifically, a circular engaging portion 31a which is formed on the bottom surface of the first bellows-fixing inner plate 31 is fitted into the circular recess 27a of the bellows-fixing under plate 27 so that the lower peripheral edge of the annular bellows 29 is held tight between the outer edge of the first bellows-fixing inner plate 31 and an upper surface of the bellows-fixing under plate 27.

An upper peripheral edge of the annular bellows 29 is fixed to the vibration-free base 35 via a second bellows-fixing inner plate 33. More specifically, a circular engaging portion 33a which is formed on an upper surface of the second bellows-fixing inner plate 33 is fitted into a circular recess 35a formed on a bottom surface of the vibration-free base 35 so that the upper peripheral edge of the annular bellows 29 is held tight between the outer edge of the second bellows-fixing inner plate 33 and a bottom surface of the vibration-free base 35. The under plate 27 and the first bellows-fixing inner plate 31, and the vibration-free base 35 and the second bellows-fixing inner plate 33 are formed to have symmetrical shapes, respectively. The space surrounded by the annular bellows 29 between the first bellows-fixing inner plate 31 and the second bellows-fixing inner plate 33 is formed as the aforementioned second pressure chamber S2.

Regulated compressed air is pumped into each of the first pressure chamber S1 and the second pressure chamber S2 by a common air pump (compressed air source) P and a common air-pressure control system C. The air-pressure control system C is supplied with information on vibration of the floor 3 which is sensed by a vibration detector D to control pressure of the air which is pumped into each of the first pressure chamber S1 and the second pressure chamber S2 in accordance with the detected vibration of the floor 3 so that the respective air pressures in the first and second pressure chambers S1 and S2 become the same as each other. Note that all the movable members of the vibration isolation table 1 have rotational-symmetrical shapes with respect to the axis of the swingable rod 19 in a vibration-free state (neutral state) shown in FIG. 1 in which the axis of the swingable rod 19 is coincident with the axis of the bottomed hollow cylindrical member 15.

Operations and effects of the vibration isolation table 1 having the above described structure will be discussed hereinafter.

First of all, a precision instrument (to be isolated from vibration) W such as an optical stepper or an electron microscope is mounted on the top surface of the vibration-free base 35.

In the vibration isolation table 1, the primary movable base A is held in a floating state by the first pressure chamber S1, the intermediate movable base B is held by the primary movable base A to be swingable with respect to the primary movable base A, and the vibration-free base 35 is held in a floating state above the intermediate movable base B via the second pressure chamber S2.

Figure 2:
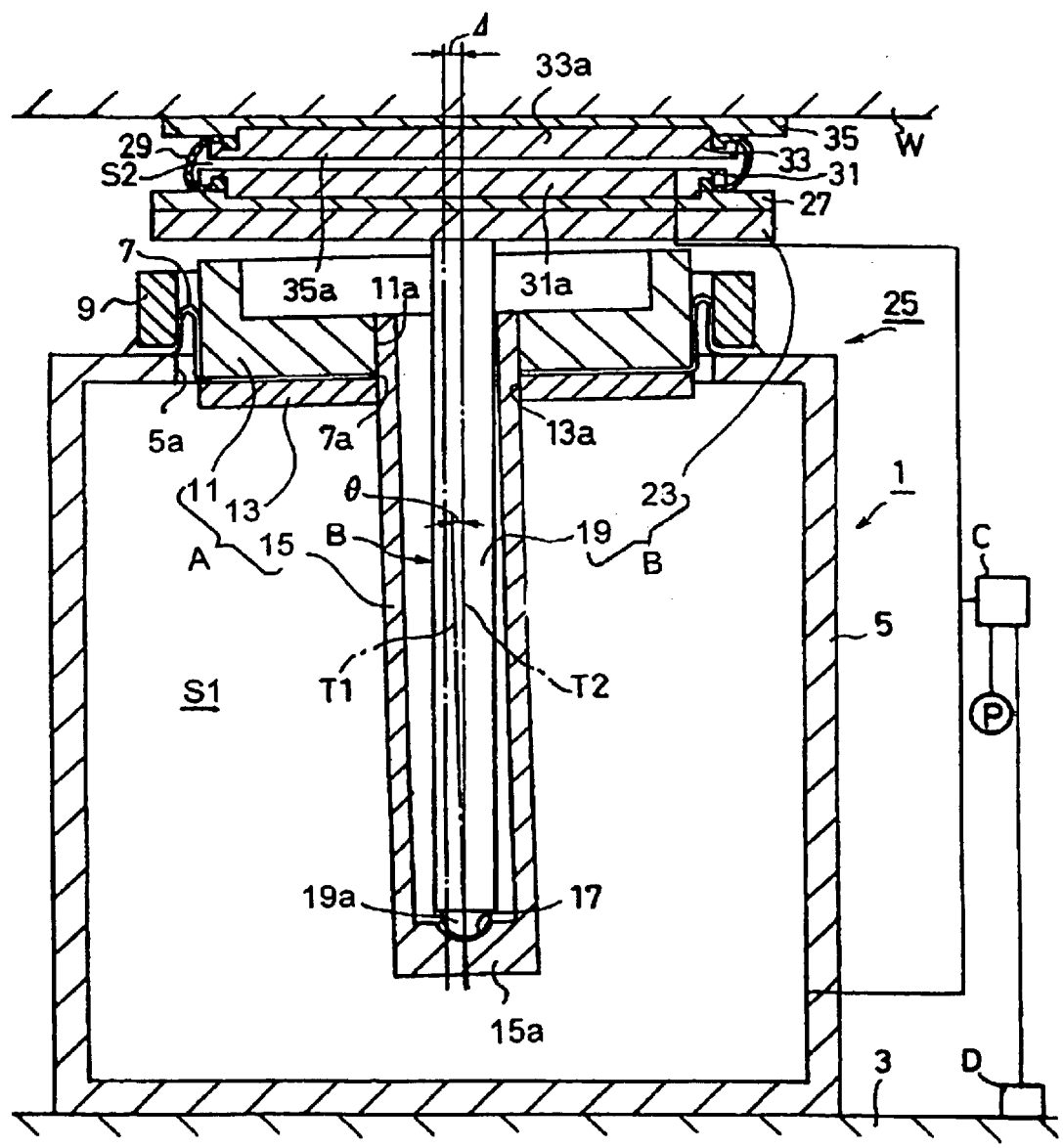
FIG. 2 is a longitudinal cross sectional view of the vibration isolation table shown in FIG. 1, showing a state where the floor on which vibration isolation table is placed vibrates horizontally.

In this state, if the floor 3 vibrates, horizontal components of the vibrations of the floor 3 are transmitted to the vibration isolation table 1 (the stationary housing 5). This causes the bottomed hollow cylindrical member 15 to swing in directions opposite to the directions of horizontal vibrations of the stationary housing 5 within a range defined by an angle θ (theta) between a vertical axis T1 and an axis T2 (see FIG. 2) of the swingable rod 19. During this swinging operation of the bottomed hollow cylindrical member 15, the swingable rod 19 keeps in a vertical position as shown in FIG. 2. Such an operation of the gimbal piston 25 greatly reduces the horizontal vibrations which are transmitted from the floor 3 to the precision instrument W.

The horizontal vibrations of the vibration isolation table 1 (the stationary housing 5) which are created by vibrations of the floor 3 (i.e., the remaining vibrations of the floor 3 which the operation of the gimbal piston 25 cannot remove) are also transmitted to the first bellows-fixing inner plate 31, the second bellows-fixing inner plate 33 and the annular bellows 29. Such horizontal vibrations cause the second bellows-fixing inner plate 33 to move horizontally with respect to the first bellows-fixing inner plate 31 in directions opposite to the directions of the horizontal vibrations of the first bellows-fixing inner plate 31 while deforming the annular bellows 29 substantially in horizontal directions (see FIG. 2). This deforming operation of the annular bellows 29 further provides a substantial reduction in the horizontal vibrations which are transmitted from the floor 3 to the precision instrument W.

Due to such operations of the bottomed hollow cylindrical member 15 and the annular bellows 29, the vibration-free base 35 does not substantially deviate horizontally (in directions opposite to the directions of the horizontal vibrations of the first bellows-fixing inner plate 31) so long as the stationary housing 5 having the gimbal piston 25 moves horizontally only within a maximum amount Δ (delta) from a neutral position thereof.

As described above, the natural vibration frequency of the vibration isolation table 1 in the horizontal direction is greatly reduced to a smaller degree by a combination of the gimbal piston 25 and the annular bellows 29 to thereby improve the performance of the horizontal vibration isolating operation of the vibration isolation table 1 by a greater degree. Accordingly, almost all horizontal vibrations of the vibration isolation table 1 which are created by vibration of the floor 3 are prevented from being transmitted to the vibration-free base 35 by the combination of the gimbal piston 25 and the annular bellows 29, thus not being transferred to the precision instrument W.

If the floor 3 vibrates vertically, the diaphragm 7 deforms vertically to allow the bottomed hollow cylindrical member 15 and the swingable rod 19 to move together up and down with respect to the stationary housing 5 while expanding and contracting the annular bellows 29 vertically. This action of the vibration isolation table 1 prevents almost all vertical vibrations of the vibration isolation table 1 which are created by vibration of the floor 3 from being transmitted to the vibration-free base 35, and accordingly, almost all vertical vibrations of the vibration isolation table 1 are not transferred to the precision instrument W.

Once the floor 3 stops vibrating, the swingable rod 19 stops swinging and automatically returns to a vertical position thereof shown in FIG. 1, and at the same time, the annular bellows 29 automatically returns to its original shape. Consequently, the precision instrument W can be supported by the vibration isolation table 1 with stability.

Although the annular bellows 29 has only a single pleat in the above illustrated embodiment of the vibration isolation table 1, the annular bellows 29 can be of a type having more than one pleat.

As can be understood from the foregoing, according to the present invention, the natural vibration frequency of a vibration isolation table in the horizontal direction can be reduced to a smaller degree than before to greatly improve the performance of the horizontal vibration isolating operation, thus exerting substantially no influence of the horizontal vibration on an object such as a precision instrument which is supported by the vibration isolation table.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A vibration isolation table comprising:

a stationary housing having an opening on a top surface thereof;

a pressure-tight flexible member which closes said opening to form a first pressure chamber in said stationary housing;

a primary movable base which is coupled to a central portion of said pressure-tight flexible member, said primary movable base having a bottomed hollow cylindrical member which is provided at a center of said primary movable base and extends downwards to be positioned in said first pressure chamber, an upper end of said bottomed hollow cylindrical member being formed as an open end;

an intermediate movable base having a swingable rod which is inserted into said bottomed hollow cylindrical member so that a bottom end of said swingable rod is supported by a bottom of said bottomed hollow cylindrical member in a manner to allow said swingable rod to swing with respect to said bottomed hollow cylindrical member; and a vibration-free base on which an object to be isolated from vibration is mounted, a second pressure chamber being formed between said intermediate movable base and said vibration-free base, said second pressure chamber being capable of expanding and contracting vertically.

2. The vibration isolation table according to claim 1, wherein said pressure-tight flexible member comprises a rolling diaphragm.

3. The vibration isolation table according to claim 1, further comprising a bellows which surrounds said second pressure chamber to form said second pressure chamber inside said bellows.

4. The vibration isolation table according to claim 3, wherein said intermediate movable base comprises a flat plate which is formed integral with an upper end of said swingable rod so that an axis of said swingable rod extends orthogonal to said flat plate, and wherein said second pressure chamber is formed between said vibration-free base and said flat plate.

5. The vibration isolation table according to claim 4, further comprising a bellows-fixing under plate which has the same shape as said vibration-free base and is fixed to an upper surface of said flat plate, wherein an upper peripheral edge and a lower peripheral edge of said bellows are fixed to said vibration-free base and said bellows-fixing under plate, respectively.

6. The vibration isolation table according to claim 1, wherein said primary movable base and said intermediate movable base constitute a gimbal piston.

7. The vibration isolation table according to claim 1, wherein respective air pressures in said first pressure chamber and said second pressure chamber are controlled so as to become the same as each other.

* * * * *